June 2, 1925.
M. C. UKMAN
WHEEL TIRE
Filed June 18, 1923
1,540,044
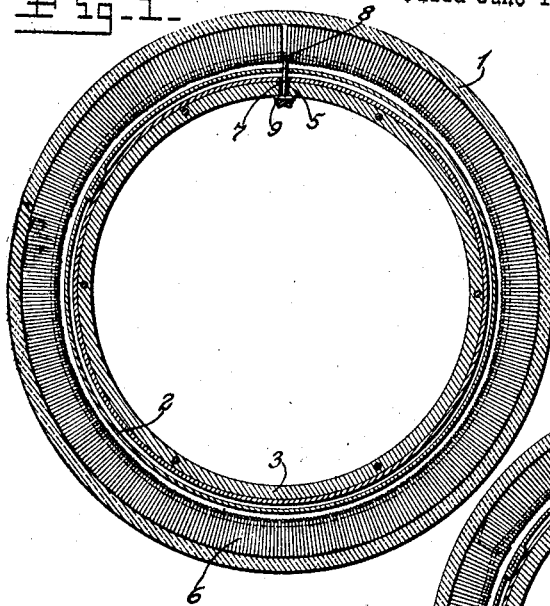
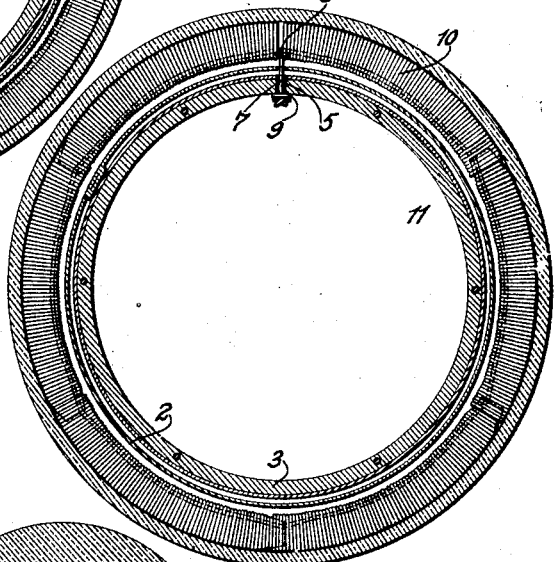
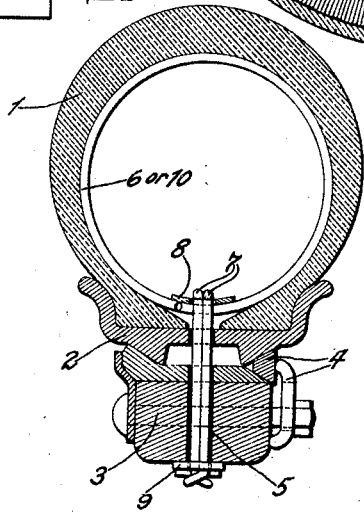
Inventor:
Max C. Ukman,
His Attorneys.

Patented June 2, 1925.

1,540,044

UNITED STATES PATENT OFFICE.

MAX C. UKMAN, OF ST. LOUIS, MISSOURI.

WHEEL TIRE.

Application filed June 18, 1923. Serial No. 646,012.

*To all whom it may concern:*

Be it known that I, MAX C. UKMAN, a citizen of the United States, residing at the city of St. Louis and State of Missouri, have invented a new and useful Wheel Tire, of which the following is a specification.

This invention relates to wheel tires, and an object is to provide an improved tire that dispenses with the usual inflatable inner tube and instead contains one or more sections of coiled springs filling the tire body and affording the desired elasticity and resiliency without being subject to puncture troubles.

Another object of the invention is to provide a wheel tire embodying the construction mentioned and also including means for securing the spring section or sections in proper relationship within the tire body.

Other objects will appear from the following description, reference being made to the drawing in which—

Fig. 1 is a sectional view of a wheel tire having a single continuous coiled spring forming an inner spring tube within the tire body.

Fig. 2 is a similar sectional view showing the inner spring tube composed of a number of separate spring sections.

Fig. 3 is a cross sectional view through one side of the tire.

The present invention is designed and adapted for use in rubber tires of usual construction, as well as in tires specially designed therefor. As shown, the usual rubber tire 1 is mounted on a familiar demountable and collapsible rim 2, and the rim 2 is held upon the wheel felly 3 by well known retaining devices 4. The rim 2 and felly 3 have a hole 5 therethrough which, in the case of wheels having inflatable tires, is for the reception of the inflation valve stem which usually extends radially toward the axis of the wheel.

As shown in Fig. 1 an inner resilient tube 6 completely fills the tire body 1 holding the tire body expanded in substantially the same manner as an inner inflatable tube. The tube 6 is a coiled spring made of a single piece of wire extending entirely around and completely filling the inside of the tire body so that every portion of the tire body is permanently retained in expanded condition. The ends of the spring tube are preferably placed near the hole 5. A clamping wire 7 is passed entirely through the spring tube 6 and has its ends extending out through the hole 5 and there rigidly bound or secured. Thus the wire 7 holds the spring tube in proper relationship to the rim and to the tire body. A washer or plate 8 is within the spring tube and extends across the gap between the ends of the spring tube. The ends of the wire 7 pass through the washer 8, thereby obtaining a strong construction at this point and preventing the wire 7 from wearing upon the spring tube. The ends of the wire 7 also pass through a washer 9 against the inside of the felly 3 and are there tied or twisted so that they cannot work loose.

In the construction shown in Fig. 2 a number of sections of spring tube 10 are provided and they are placed end to end in the tire body preferably in telescoping arrangement, as indicated at 11, so that they will hold their proper relative positions. Thus the separate sections of spring tube completely fill the tire body and obtain practically the same beneficial results as if the spring tube were composed of a single piece of wire. By this modified construction I am enabled to use shorter pieces of wire and thus avoid waste that would otherwise occur in the manufacture of the device.

My invention avoids many of the difficulties and troubles occurring in the use of inflatable tires as, for instance, puncture troubles. It is obvious that a puncture will not seriously affect the spring tube whether this tube be made in a single section or in more than one section. The tire may be mounted and removed as easily as the usual inflatable tube and may be economically manufactured.

The invention may be modified in equivalent particulars without departure from the principle thereof. I do not restrict myself unessentially but what I claim and desire to secure by Letters Patent is:—

1. A wheel comprising a rim, a felly upon which the rim is mounted, a hollow split tire body mounted on the rim, a coiled wire tube holding the tire body expanded and having its ends adjacently disposed, a plate inside the wire tube extending across the gap between the ends of the wire tube and overlapping adjacent end coils of the tube, a clamp wire passing through the wire tube and through said plate and through the rim and felly, and means in connection with the ends of said clamping wire holding said wire clamped against the wire tube.

2. The combination with a wheel, of a hollow split tire body mounted on the wheel, a spring tube composed of coiled wire within and holding the tire body expanded, a plate within the spring tube overlapping adjacent coils thereof, and a clamping wire passing through the spring tube and through said plate and being clamped against said tube.

MAX C. UKMAN.